(12) United States Patent
Shock

(10) Patent No.: US 11,267,689 B2
(45) Date of Patent: Mar. 8, 2022

(54) MOBILE DISTRIBUTION STATION HAVING AUXILIARY DELIVERY SYSTEM

(71) Applicant: Fuel Automation Station, LLC, Birmingham, MI (US)

(72) Inventor: Ricky Dean Shock, Victoria, TX (US)

(73) Assignee: FUEL AUTOMATION STATION, LLC., Birmingham, MI (US)

(*) Notice: Subject to any disclaimer, the term of this patent is extended or adjusted under 35 U.S.C. 154(b) by 259 days.

(21) Appl. No.: 16/111,601

(22) Filed: Aug. 24, 2018

(65) Prior Publication Data
US 2020/0062578 A1 Feb. 27, 2020

(51) Int. Cl.
| | |
|---|---|
| *B67D 7/16* | (2010.01) |
| *G05D 7/06* | (2006.01) |
| *B67D 7/36* | (2010.01) |
| *B67D 7/84* | (2010.01) |
| *B67D 7/62* | (2010.01) |
| *B67D 7/78* | (2010.01) |
| *B67D 7/40* | (2010.01) |

(52) U.S. Cl.
CPC ............. *B67D 7/16* (2013.01); *B67D 7/36* (2013.01); *B67D 7/40* (2013.01); *B67D 7/62* (2013.01); *B67D 7/78* (2013.01); *B67D 7/845* (2013.01); *G05D 7/0652* (2013.01)

(58) Field of Classification Search
None
See application file for complete search history.

(56) References Cited

U.S. PATENT DOCUMENTS

| | | | |
|---|---|---|---|
| 9,586,805 B1 * | 3/2017 | Shock | B67D 7/40 |
| 9,790,080 B1 * | 10/2017 | Shock | B67D 7/3272 |
| 10,150,662 B1 * | 12/2018 | Shock | B67D 7/74 |
| 10,442,676 B1 * | 10/2019 | Walther | B65H 75/4478 |
| 10,494,251 B2 * | 12/2019 | Shock | B67D 7/04 |
| 10,513,426 B2 * | 12/2019 | Shock | B67D 7/3218 |
| 2004/0007286 A1 * | 1/2004 | Kamikozuru | B60P 3/2245 141/231 |
| 2015/0123462 A1 * | 5/2015 | Kamradt | B64C 39/024 307/9.1 |
| 2016/0347603 A1 * | 12/2016 | Zammit | B60K 15/03 |
| 2017/0313570 A1 * | 11/2017 | Kittoe | B67D 7/3209 |

(Continued)

FOREIGN PATENT DOCUMENTS

CA 2693567 10/2010

*Primary Examiner* — Daphne M Barry
(74) *Attorney, Agent, or Firm* — Carlson, Gaskey & Olds, P.C.

(57) ABSTRACT

A distribution station includes a mobile trailer and first and second pumps on the trailer. At least one manifold on the mobile trailer is fluidly connected with the first pump. A plurality of first reels on the mobile trailer are fluidly connected with the at least one manifold. A plurality of first hoses are connected with different ones of the first reels. A plurality of first valves on the mobile trailer are situated between the manifold and respective different ones of the first reels. A plurality of fluid level sensors are associated with different ones of the first hoses. A second reel is not fluidly connected with the manifold, and is fluidly connected with the second pump. A second hose is connected with the second reel that has a manual pump handle, and a controller is configured to individually open and close the valves responsive to the fluid level sensors.

17 Claims, 3 Drawing Sheets

(56) References Cited

U.S. PATENT DOCUMENTS

| | | | |
|---|---|---|---|
| 2018/0099862 A1* | 4/2018 | Shock | B67D 7/845 |
| 2018/0101183 A1* | 4/2018 | Shock | B67D 7/465 |
| 2019/0031497 A1* | 1/2019 | Frizzie | B67D 7/40 |
| 2019/0359476 A1* | 11/2019 | Walther | B67D 7/62 |
| 2021/0188616 A1* | 6/2021 | Shock | B67D 7/845 |
| 2021/0206622 A1* | 7/2021 | Shock | B67D 7/36 |
| 2021/0221570 A1* | 7/2021 | Shock | B60K 15/0406 |

* cited by examiner

MOBILE DISTRIBUTION STATION HAVING AUXILIARY DELIVERY SYSTEM

BACKGROUND

Hydraulic fracturing (also known as fracking) is a well-stimulation process that utilizes pressurized liquids to fracture rock formations. Pumps and other equipment used for hydraulic fracturing typically operate at the surface of the well site. The equipment may operate until refueling is needed, at which time the equipment may be shut-down for refueling. Shut-downs are costly and reduce efficiency. More preferably, to avoid shut-downs fuel is replenished in a hot-refueling operation while the equipment continues to run. This permits fracking operations to proceed continuously. However, hot-refueling can be difficult to reliably sustain for the duration of the fracking operation.

SUMMARY

A distribution station according to an example of the present disclosure includes a mobile trailer and first and second pumps on the mobile trailer. At least one manifold on the mobile trailer is fluidly connected with the first pump. A plurality of first reels on the mobile trailer are fluidly connected with the at least one manifold. A plurality of first hoses are connected with different ones of the first reels. A plurality of first valves on the mobile trailer are situated between the manifold and respective different ones of the first reels. A plurality of fluid level sensors are associated with different ones of the first hoses. A second reel is not fluidly connected with the manifold, and is fluidly connected with the second pump. A second hose is connected with the second reel that has a manual pump handle, and a controller is configured to individually open and close the valves responsive to the fluid level sensors.

A further embodiment of any of the foregoing embodiments includes a diesel exhaust fuel source fluidly connected with the second pump.

In a further embodiment of any of the foregoing embodiments, the diesel exhaust fuel source is external of the mobile trailer.

A further embodiment of any of the foregoing embodiments includes comprising a second valve situated between the second pump and the second reel and operable to open and close flow from the second pump to the second reel.

A further embodiment of any of the foregoing embodiments includes an air eliminator situated between the second pump and the second reel.

A further embodiment of any of the foregoing embodiments includes a meter situated between the second pump and the second reel. The meter is in communication with the controller.

A further embodiment of any of the foregoing embodiments includes a second valve situated between the second pump and the second reel and operable to open and close flow from the second pump to the second reel, and an air eliminator situated between the second valve and the pump.

A further embodiment of any of the foregoing embodiments includes an air eliminator situated between the second pump and the second reel, and a meter situated between the air eliminator and the second reel. The meter is in communication with the controller.

A further embodiment of any of the foregoing embodiments includes a second valve situated between the second pump and the second reel and operable to open and close flow from the second pump to the second reel, and a meter situated between the second valve and the second reel. The meter is in communication with the controller.

A further embodiment of any of the foregoing embodiments includes a second valve situated between the second pump and the second reel and operable to open and close flow from the second pump to the second reel, an air eliminator situated between the second valve and the pump, and a meter situated between the second valve and the second reel. The meter is in communication with the controller.

A further embodiment of any of the foregoing embodiments includes a diesel exhaust fuel source fluidly connected with the second pump.

A further embodiment of any of the foregoing embodiments includes a flexible coupling situated between the second pump and the second reel.

A distribution station according to an example of the present disclosure includes a mobile trailer and first and second pumps on the mobile trailer. At least one manifold on the mobile trailer is fluidly connected with the first pump. A plurality of first reels on the mobile trailer are fluidly connected with the at least one manifold. A plurality of first hoses are connected with different ones of the first reels. A plurality of first valves on the mobile trailer are situated between the manifold and a respective different one of the first reels. A plurality of fluid level sensors are associated with different ones of the first hoses. A second reel is not fluidly connected with the at least one manifold and is fluidly connected with the second pump. A second hose connected with the second reel that has a manual pump handle. A controller is configured to individually open and close the valves responsive to the fluid level sensors. A first fuel source of a first fuel type is fluidly connected with the first pump, and a second fuel source of a second fuel type is fluidly connected with the second pump.

In a further embodiment of any of the foregoing embodiments, the first fuel source and the second fuel source are external of the mobile trailer.

A further embodiment of any of the foregoing embodiments includes a second valve situated between the second pump and the second reel and operable to open and close flow from the second pump to the second reel, an air eliminator situated between the second valve and the pump, and a meter situated between the second valve and the second reel. The meter is in communication with the controller.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
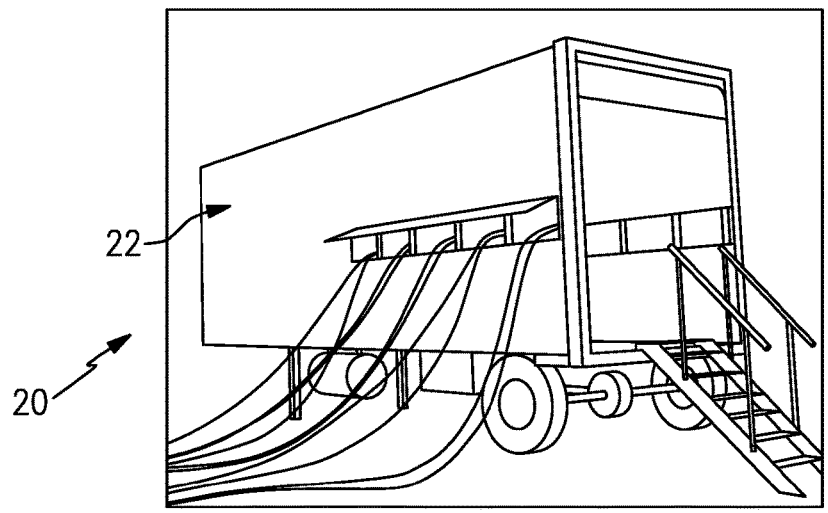
FIG. 1 illustrates an example mobile distribution station.
Figure 2:
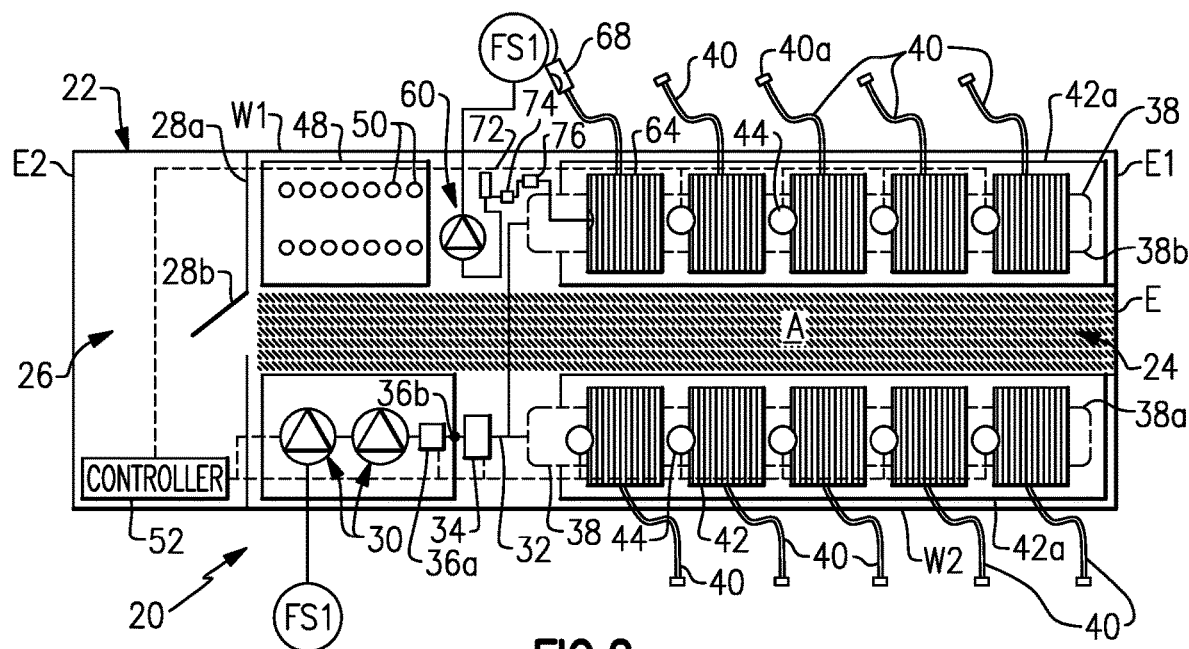
FIG. 2 illustrates an internal layout of a mobile distribution station.

FIG. 1 illustrates a mobile distribution station 20 and FIG. 2 illustrates an internal layout of the station 20. As will be described, the station 20 may serve in a "hot-refueling" capacity to distribute fuel to multiple pieces of equipment while the equipment is running, such as fracking equipment at a well site. As will be appreciated, the station 20 is not limited to applications for fracking or for delivering fuel. The examples herein may be presented with respect to fuel delivery, but the station 20 may be used in mobile delivery of other fluids, in other gas/petroleum recovery operations, or in other operations where mobile refueling or fluid delivery will be of benefit.

In this example, the station 20 includes a mobile trailer 22. Generally, the mobile trailer 22 is elongated and has first and second opposed trailer side walls W1 and W2 that join first and second opposed trailer end walls E1 and E2. Most typically, the trailer 22 will also have a closed top (not shown). The mobile trailer 22 may have wheels that permit the mobile trailer 22 to be moved by a vehicle from site to site to service different hot-refueling operations. In this example, the mobile trailer 22 has two compartments. A first compartment 24 includes the physical components for distributing fuel, such as diesel fuel, and a second compartment 26 serves as an isolated control room for managing and monitoring fuel distribution. The compartments 24/26 are separated by an inside wall 28*a* that has an inside door 28*b*.

The first compartment 24 includes one or more first pumps 30. Fuel may be provided to the one or more first pumps 30 from an external fuel source FS1 of a first type of fuel, such as a tanker truck on the site that has diesel fuel. On the trailer 22, the one or more first pumps 30 are fluidly connected via a fuel line 32 with one or more high precision registers 34 for metering fuel. The fuel line 32 may include, but is not limited to, hard piping. In this example, the fuel line 32 includes a filtration and air eliminator system 36*a* and one or more sensors 36*b*. Although optional, the system 36*a* is beneficial in many implementations, to remove foreign particles and air from the fuel prior to delivery to the equipment. The one or more sensors 36*b* may include a temperature sensor, a pressure sensor, or a combination thereof, which assist in fuel distribution management.

The fuel line 32 is connected with one or more manifolds 38. In the illustrated example, the station 20 includes two manifolds 38, represented at 38*a* and 38*b*, that arranged on opposed sides of the compartment 24. As an example, the manifolds 38 are elongated tubes that are generally larger in diameter than the fuel line 32 and that has at least one inlet and multiple outlets. The mobile trailer further includes a plurality of first hoses 40, which are used to deliver the fuel from the fuel source FS1. Each first hose 40 is wound, at least initially, on a respective first reel 42 that is rotatable to extend or retract the first hose 40 externally through one or more windows of the trailer 22. Each first reel 42 may have an associated motor to mechanically extend and retract the first hose 40.

Figure 3:
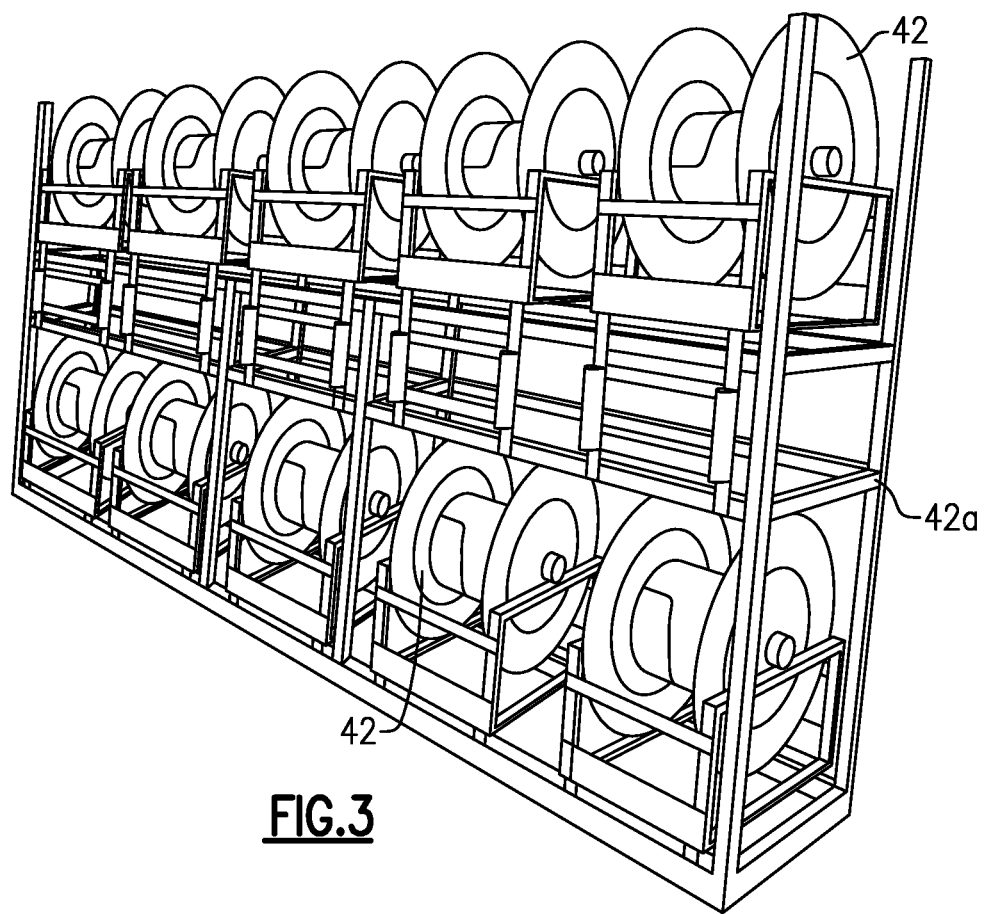
FIG. 3 illustrates an isolated view of hose reels on a support rack used in a mobile distribution station.

As shown in an isolated view in FIG. 3, the first reels 42 are mounted on a support rack 42*a*. In this example, the support rack 42*a* is configured with upper and lower rows of first reels 42. In this example, there are two support racks 42*a* (FIG. 2) arranged on opposed sides of the first compartment 24, with an aisle (A) that runs between the support racks 42*a* from an outside door E to the inside door 28*b*. As will be appreciated, fewer or additional reels and hoses may be used in alternative examples.

Figure 4:
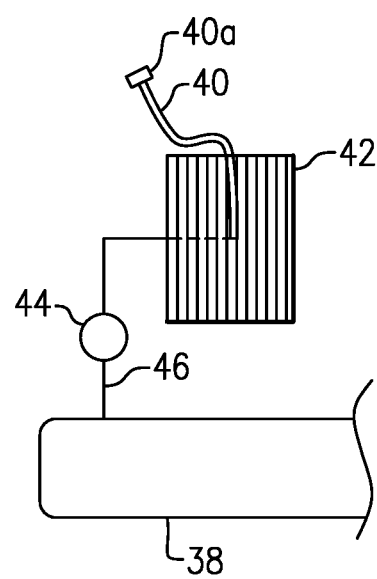
FIG. 4 illustrates an example of a connection between a manifold, a control valve, and a reel.

As shown in a representative example in FIG. 4, each first hose 40 is connected to a respective one of the first reels 42 and a respective one of a plurality of control valves 44. For example, a secondary fuel line 46 leads from the manifold 38 to the first reel 42. The control valve 44 is in the secondary fuel line 46. The control valve 44 is moveable between open and closed positions to selectively permit fuel flow from the manifold 38 to the first reel 42 and the first hose 40. For example, the control valve 44 is a powered valve, such as a solenoid valve.

In the illustrated example, the first compartment 24 also includes a sensor support rack 48. The sensor support rack 48 holds integrated fuel cap sensors 50 (when not in use), or at least portions thereof. When in use, each integrated fuel cap sensor 50 is temporarily affixed to a piece of equipment (i.e., the fuel tank of the equipment) that is subject to the hot-refueling operation. Each first hose 40 may include a connector end 40*a* and each integrated fuel cap sensor 50 may have a corresponding mating connector to facilitate rapid connection and disconnection of the first hose 40 with the integrated fuel cap sensor 50. For example, the connector end 40*a* and mating connector on the integrated fuel cap sensor 50 form a hydraulic quick-connect.

At least the control valves 44, first pump or pumps 30, sensor or sensors 36*b*, and register 34 are in communication with a controller 52 located in the second compartment 26. As an example, the controller 52 includes software, hardware, or both that is configured to carry out any of the functions described herein. In one further example, the controller 52 includes a programmable logic controller with a touch-screen for user input and display of status data. For example, the screen may simultaneously show multiple fluid levels of the equipment that is being serviced.

When in operation, the integrated fuel cap sensors 50 are mounted on respective fuel tanks of the pieces of equipment that are subject to the hot-refueling operation. The first hoses 40 are connected to the respective integrated fuel cap sensors 50. Each integrated fuel cap sensor 50 generates signals that are indicative of the fuel level in the fuel tank of the piece of equipment on which the integrated fuel cap sensor 50 is mounted. The signals are communicated to the controller 52.

The controller 52 interprets the signals and determines the fuel level for each fuel tank of each piece of equipment. In response to a fuel level that falls below a lower threshold, the controller 52 opens the control valve 44 associated with the first hose 40 to that fuel tank and activates the first pump or pumps 30. The first pump or pumps 30 provide fuel flow into the manifolds 38 and through the open control valve 44 and first reel 42 such that fuel is provided through the respective first hose 40 and integrated fuel cap sensor 50 into the fuel tank. The lower threshold may correspond to an empty fuel level of the fuel tank, but more typically the lower threshold will be a level above the empty level to reduce the potential that the equipment completely runs out of fuel and shuts down.

The controller 52 also determines when the fuel level in the fuel tank reaches an upper threshold. The upper threshold may correspond to a full fuel level of the fuel tank, but more typically the upper threshold will be a level below the full level to reduce the potential for overflow. In response to reaching the upper threshold, the controller 52 closes the respective control valve 44 and ceases the first pump or pumps 30. If other control valves 44 are open or are to be opened, the first pump or pumps 30 may remain on. The controller 52 can also be programmed with an electronic stop failsafe measure to prevent over-filling. As an example, once an upper threshold is reached on a first tank and the control valve 44 is closed, but the first pump 30 is otherwise to remain on to fill other tanks, if the fuel level continues to rise in the first tank, the controller 52 shuts the first pump 30 off.

Multiple control valves 44 may be open at one time, to provide fuel to multiple fuel tanks at one time. Alternatively, if there is demand for fuel from two or more fuel tanks, the controller 52 may sequentially open the control valves 44 such that the tanks are refueled sequentially. For instance, upon completion of refueling of one fuel tank, the controller 52 closes the control valve 44 of the first hose 40 associated with that tank and then opens the next control valve 44 to begin refueling the next fuel tank. Sequential refueling may facilitate maintaining internal pressure in the manifold and fuel line 32 above a desired or preset pressure threshold to more rapidly deliver fuel. Similarly, the controller 52 may limit the number of control valves 44 that are open at any one instance in order to maintain the internal pressure in the manifold and fuel line 32 above a desired or preset threshold. The controller 52 may perform the functions above while in an automated operating mode. Additionally, the controller 52 may have a manual mode in which a user can control at least some functions through the PLC, such as starting and stopped the first pump 30 and opening and closing control valves 44. For example, manual mode may be used at the beginning of a job when initially filling tanks to levels at which the fuel cap sensors 50 can detect fuel and/or during a job if a fuel cap sensor 50 becomes inoperable. Of course, operating in manual mode may deactivate some automated functions, such as filling at the low threshold or stopping at the high threshold.

In addition to the use of the sensor signals to determine fuel level, or even as an alternative to use of the sensor signals, the refueling may be time-based. For instance, the fuel consumption of a given piece of equipment may be known such that the fuel tank reaches the lower threshold at known time intervals. The controller 52 is operable to refuel the fuel tank at the time intervals rather than on the basis of the sensor signals, although sensor signals may also be used to verify fuel level.

The controller 52 also tracks the amount of fuel provided to the fuel tanks. For instance, the register 34 precisely measures the amount of fuel provided from the pump or pumps 30. As an example, the register 34 is an electronic register and has a resolution of about 0.1 gallons. The register 34 communicates measurement data to the controller 52. The controller 52 can thus determine the total amount of fuel used to very precise levels. The controller 52 may also be configured to provide outputs of the total amount of fuel consumed. For instance, a user may program the controller 52 to provide outputs at desired intervals, such as by worker shifts or daily, weekly, or monthly periods. The outputs may also be used to generate invoices for the amount of fuel used. As an example, the controller 52 may provide a daily output of fuel use and trigger the generation of an invoice that corresponds to the daily fuel use, thereby enabling almost instantaneous invoicing.

In a further example, the integrated fuel cap sensors 50 are each hard-wired to the controller 52. The term "hard-wired" or variations thereof refers to a wired connection between two components that serves for electronic communication there between, which here is a sensor and a controller. The hard-wiring may facilitate providing more reliable signals from the integrated fuel cap sensors 50. For instance, the many pieces of equipment, vehicles, workers, etc. at a site may communicate using wireless devices. The wireless signals may interfere with each other and, therefore, degrade communication reliability. Hard-wiring the integrated fuel cap sensors 50 to the controller 52 facilitates reduction in interference and thus enhances reliability.

As will be appreciated, all of the first hoses 40 and first reels 42 are connected to the manifolds 38 and first pump or pumps 30. As a result, the first hoses 40 can be used to deliver fuel from the first fuel source FS1. There may also be a need to deliver a different type of fuel or other fluid. In this regard, the mobile trailer 22 also includes an auxiliary delivery system 60 (FIG. 2), for delivering a second fluid, such as a second type of fuel from a second fuel source FS2. As an example, the first fuel may be diesel fuel and the second fuel may be diesel exhaust fluid (DEF). DEF is an aqueous urea solution made with approximately 32.5% urea and 67.5% deionized water according to ISO 22241. Thus, the station 20 may be used to deliver a primary fluid, such as diesel fuel, using the first hoses 40, first reels 42, manifolds 38, and first pump or pumps 30, and a second fluid, such as the DEF, using the auxiliary delivery system 60.

Figure 5:
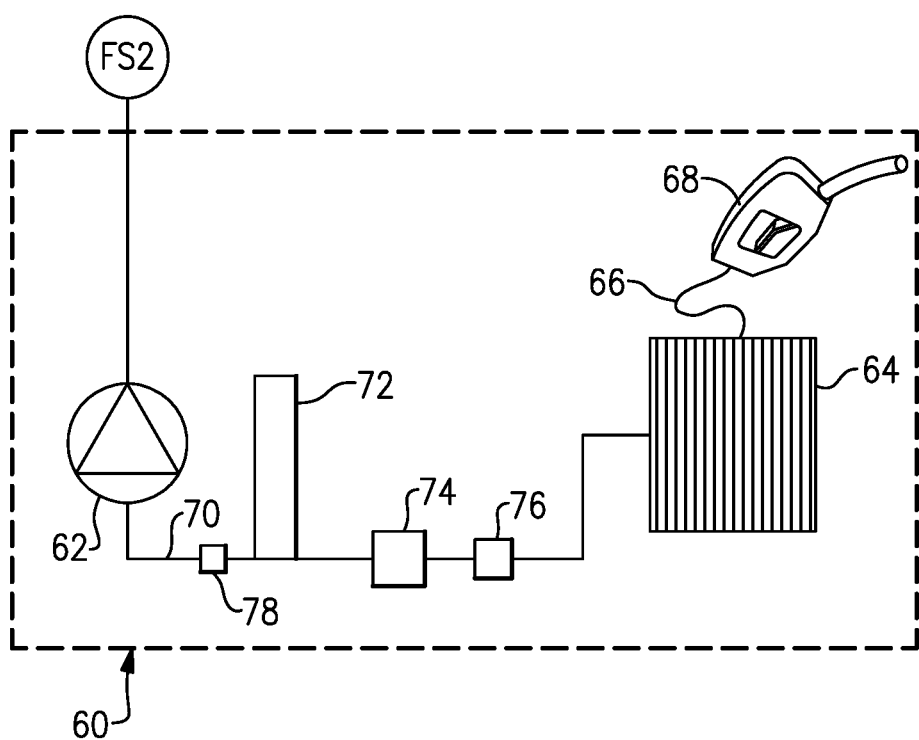
FIG. 5 illustrates an example of an auxiliary delivery system for supplying diesel exhaust fluid, for example.

FIG. 5 illustrates an isolated view of the auxiliary delivery system 60, with continued reference also to FIG. 2. The system 60 includes a second pump 62, a second reel 64, a second hose 66 connected with the second reel 64, and a manual pump handle 68 at the end of the second hose 66. The second reel 64 and the second hose 66 are not fluidly connected with the manifold 38 but instead are fluidly connected with the second pump 62 via line 70, such as hard piping. The second reel 64 and second hose 66 may be the same or similar to the first reels 42 and first hoses 40.

The second pump 62 is operable to pump the DEF, or other fluid, from the second fuel source FS2, through the line 70, through the second reel 64, and to the second hose 66. The second pump 62 may be activated and deactivated manually or may be connected to the controller 52 for automated activation and deactivation. The manual pump handle 68 may be used to manually refuel equipment at a site, such as but not limited to, pump trucks. The manual pump handle 68 may be an automatic shut-off handle, similar to those used at vehicle gas stations.

The system 60 may also optionally include additional components that facilitate fuel or fluid delivery. For example, the system 60 may include an air eliminator 72, a flow valve 74, and a meter 76 situated in the line 70 between the second pump 62 and the second reel 64. In this example, the air eliminator 72 is between the second pump 62 and the flow valve 74, and the meter is between the flow valve 74 and the second reel 64.

The flow valve 74 is operable to open and close to, respectively, start or stop flow from the second pump 62 to the second reel 64 and second hose 68. The flow valve 74 may be a manual valve or an automated valve, such as a solenoid, that is in communication with the controller 52. The meter 76, such as a turbine flow meter, is operable to measure the flow through the line 70 to the second reel 64 and the second hose 68. The meter 76 may be in communication with the controller 52 and may send signals to the controller 52 that are representative of the flow through the line 70. In this manner, the controller 52 may track the amount of fuel or fluid delivered by the system 60. Similar to the fluid or fuel delivered by the pump or pumps 30 through the first hoses 40, the controller 52 may be configured to provide outputs of the total amount of fuel or fluid delivered by the system 60. For instance, a user may program the controller 52 to provide outputs at desired intervals, such as by worker shifts or daily, weekly, or monthly periods. The outputs may also be used to generate invoices for the amount of fuel used. As an example, the controller 52 may provide a daily output of fuel use and trigger the generation of an invoice that corresponds to the daily fuel use, thereby enabling almost instantaneous invoicing.

The air eliminator 72 vents air that may be in the fuel or fluid so that the air does not distort the flow readings of the meter 76. Thus, the air eliminator 72 is located upstream of the meter 76.

Optionally, the system 60 may also include a flexible coupling 78. The flexible coupling 78 permits movement in the connection between the second pump 62 and the second reel 64. For instance, the flexible coupling 78 may permit relative axial, bending, and/or torsional movement between sections of the line 70. The station 20 may thus benefit from the durability of hard piping (in comparison to rubber hose), while also mitigating vibrational effects. In particular, at well sites there may be ground vibrations from the well equipment, such as the pumps at a fracking site. These vibrations may vary in magnitude and may occur continuously over several hours or days, or intermittently as isolated vibration events. The vibrations may be transmitted into the station 20 and may cause stress elevations and fatigue on the components and line or pipe connections in the station 20. In this regard, the flexible coupling 78 may be used to mitigate the effects of vibrations. As will be appreciated, although the flexible coupling 78 in this example is located between the second pump 62 and the air eliminator 72, a flexible coupling 78 could additionally or alternatively be used in other locations in the line 70 up to the second reel 64.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A distribution station comprising:
a mobile trailer;
first and second pumps on the mobile trailer;
at least one manifold on the mobile trailer fluidly connected with the first pump;
a plurality of first reels on the mobile trailer fluidly connected with the at least one manifold;
a plurality of first hoses, each said first hose connected with a different one of the first reels;
a plurality of first valves on the mobile trailer, each said first valve situated between the at least one manifold and a respective different one of the first reels;
a plurality of fluid level sensors, each said fluid level sensor being associated with a different one of the first hoses;
a second reel that is not fluidly connected with the at least one manifold, is not fluidly connected with the first pump, and is fluidly connected with the second pump;
a second hose connected with the second reel, the second hose having a manual pump handle; and
a controller configured to individually open and close the valves responsive to the fluid level sensors.

2. The distribution station as recited in claim 1, further comprising a diesel exhaust fuel source fluidly connected with the second pump.

3. The distribution station as recited in claim 2, wherein the diesel exhaust fuel source is external of the mobile trailer.

4. The distribution station as recited in claim 1, further comprising a second valve situated between the second pump and the second reel and operable to open and close flow from the second pump to the second reel.

5. The distribution station as recited in claim 1, further comprising an air eliminator situated between the second pump and the second reel.

6. The distribution station as recited in claim 1, further comprising a meter situated between the second pump and the second reel, the meter being in communication with the controller.

7. The distribution station as recited in claim 1, further comprising a second valve situated between the second pump and the second reel and operable to open and close flow from the second pump to the second reel, and an air eliminator situated between the second valve and the pump.

8. The distribution station as recited in claim 1, further comprising an air eliminator situated between the second pump and the second reel, and a meter situated between the air eliminator and the second reel, the meter being in communication with the controller.

9. The distribution station as recited in claim 1, further comprising a second valve situated between the second pump and the second reel and operable to open and close flow from the second pump to the second reel, and a meter situated between the second valve and the second reel, the meter being in communication with the controller.

10. The distribution station as recited in claim 1, further comprising a second valve situated between the second pump and the second reel and operable to open and close flow from the second pump to the second reel, an air eliminator situated between the second valve and the second pump, and a meter situated between the second valve and the second reel, the meter being in communication with the controller.

11. The distribution station as recited in claim 10, further comprising a diesel exhaust fuel source fluidly connected with the second pump.

12. The distribution station as recited in claim 10, further comprising a flexible coupling situated between the second pump and the second reel.

13. The distribution station as recited in claim 1, wherein the manual pump handle has a manually actuatable handle and a spout.

14. The distribution station as recited in claim 1, further comprising a second valve situated between the second pump and the second reel and operable to open and close flow from the second pump to the second reel, an air eliminator situated between the second pump and the second reel, and a meter situated between the second pump and the second reel, the meter being in communication with the controller, wherein the second valve, the air eliminator, and the meter are not fluidly connected with the first pump.

15. A distribution station comprising:
a mobile trailer;
first and second pumps on the mobile trailer;
at least one manifold on the mobile trailer fluidly connected with the first pump;
a plurality of first reels on the mobile trailer fluidly connected with the at least one manifold;

a plurality of first hoses, each said first hose connected with a different one of the first reels;

a plurality of first valves on the mobile trailer, each said first valve situated between the at least one manifold and a respective different one of the first reels;

a plurality of fluid level sensors, each said fluid level sensor being associated with a different one of the first hoses;

a second reel that is not fluidly connected with the at least one manifold, is not fluidly connected with the first pump, and is fluidly connected with the second pump;

a second hose connected with the second reel, the second hose having a manual pump handle;

a controller configured to individually open and close the first valves responsive to the fluid level sensors;

a first fuel source of a first fuel type fluidly connected with the first pump; and a second fuel source of a second fuel type that is different than the first fuel type and is fluidly connected with the second pump.

16. The distribution station as recited in claim 15, wherein the first fuel source and the second fuel source are external of the mobile trailer.

17. The distribution station as recited in claim 15, further comprising a second valve situated between the second pump and the second reel and operable to open and close flow from the second pump to the second reel, an air eliminator situated between the second valve and the pump, and a meter situated between the second valve and the second reel, the meter being in communication with the controller.

\* \* \* \* \*